(12) United States Patent
Mortensen et al.

(10) Patent No.: US 11,976,893 B2
(45) Date of Patent: May 7, 2024

(54) COOLING TOWER WITH BASIN SHIELD

(71) Applicant: SPX Cooling Technologies, Inc., Overland Park, KS (US)

(72) Inventors: Kenneth P. Mortensen, Bonner Springs, KS (US); Joseph B. Evans, Kansas City, MO (US); Robert A. Negless, Grandview, MO (US)

(73) Assignee: SPX COOLING TECH, LLC, Overland Park, KS (US)

( * ) Notice: Subject to any disclaimer, the term of this patent is extended or adjusted under 35 U.S.C. 154(b) by 841 days.

(21) Appl. No.: 16/776,760

(22) Filed: Jan. 30, 2020

(65) Prior Publication Data

US 2021/0018283 A1 Jan. 21, 2021

Related U.S. Application Data

(60) Provisional application No. 62/875,717, filed on Jul. 18, 2019.

(51) Int. Cl.
*F28F 25/02* (2006.01)
*F28C 1/00* (2006.01)
*B01D 35/02* (2006.01)
*B01D 35/05* (2006.01)
*F28F 25/00* (2006.01)

(52) U.S. Cl.
CPC ............. *F28F 25/02* (2013.01); *F28C 1/00* (2013.01); *B01D 35/02* (2013.01); *B01D 35/05* (2013.01); *F28F 2025/005* (2013.01)

(58) Field of Classification Search
CPC . B01D 35/02; B01D 35/05; F28C 1/00; F28F 25/02; F28F 2025/005

USPC ...................... 261/5, 30, DIG. 11
See application file for complete search history.

(56) References Cited

U.S. PATENT DOCUMENTS

| | | | |
|---|---|---|---|
| 385,769 A * | 7/1888 | Miller | B01F 23/234 261/113 |
| 3,258,422 A | 6/1966 | Ferry | |
| 4,333,887 A * | 6/1982 | Goettl | F24F 6/04 261/36.1 |
| 4,498,262 A * | 2/1985 | Garcia | E04D 13/002 52/90.2 |
| 5,232,636 A * | 8/1993 | Cates | F28F 19/01 261/DIG. 11 |
| 5,348,692 A * | 9/1994 | Bickerstaff | F28F 25/04 261/DIG. 11 |
| 5,431,858 A * | 7/1995 | Harrison, Jr. | F28F 25/02 261/DIG. 11 |

(Continued)

FOREIGN PATENT DOCUMENTS

| CN | 205175164 U | 4/2016 |
|---|---|---|
| CN | 107144153 A | 9/2017 |

(Continued)

OTHER PUBLICATIONS

English Abstract of CN 107746114-A (Year: 2018).*
English language translation of EP 3306246-A1 (Year: 2018).*
English language translation of RU 2743442-C1 (Year: 2021).*

*Primary Examiner* — Charles S Bushey
(74) *Attorney, Agent, or Firm* — Husch Blackwell LLP (57) ABSTRACT

The present disclosure relates to a cooling tower. The cooling tower includes a fill media, a water distribution system to distribute water to the fill media, a basin to collect the water, and a shield disposed within the tower.

17 Claims, 9 Drawing Sheets

(56) References Cited

U.S. PATENT DOCUMENTS

| | | | | |
|---|---|---|---|---|
| 5,837,133 | A * | 11/1998 | Natale | ........................ E04H 4/10 |
| | | | | 210/167.01 |
| 8,628,066 | B2 * | 1/2014 | Boyd | ...................... F28F 25/04 |
| | | | | 261/DIG. 11 |
| 2005/0029176 | A1 | 2/2005 | Miyamoto et al. | |
| 2013/0134611 | A1 * | 5/2013 | Colclasure | .............. F28F 25/00 |
| | | | | 261/36.1 |
| 2018/0172367 | A1 * | 6/2018 | Shin | ........................ B01D 5/003 |

FOREIGN PATENT DOCUMENTS

| | | | | |
|---|---|---|---|---|
| CN | 207050499 U | 2/2018 | | |
| CN | 107746114 A | 3/2018 | | |
| CN | 207622564 U | 7/2018 | | |
| CN | 208269692 U | 12/2018 | | |
| EP | 3 306 246 A1 * | 4/2018 | ................ | F28C 1/14 |
| JP | 63-67772 U | 5/1988 | | |
| JP | 11-14270 A | 1/1999 | | |
| JP | 2011-242100 A | 12/2011 | | |
| RU | 2 743 442 C1 * | 2/2021 | ................ | F28C 1/00 |

\* cited by examiner

COOLING TOWER WITH BASIN SHIELD

CROSS REFERENCE TO RELATED APPLICATIONS

This application claims priority to U.S. Provisional Application Ser. No. 62/875,717, filed Jul. 18, 2019, titled COOLING TOWER WITH BASIN SHIELD, the disclosure of which is incorporated herein by reference in its entirety.

FIELD OF THE INVENTION

The present disclosure relates generally to cooling towers or heat exchange towers. More particularly, the present disclosure relates, for example, to light shielding and/or debris filtration of a basin in a cooling tower.

BACKGROUND OF THE INVENTION

Cooling towers are heat exchangers of a type widely used to emanate low grade heat into the atmosphere and are typically utilized in electricity generation, process and manufacturing cooling, air conditioning installations, and the like. These towers receive a relatively warm or hot fluid such as water, and pass the fluid through the tower apparatus so that heat is extracted from the fluid by interaction with relatively cooler ambient air.

Cooling towers generally include counter-flow type cooling towers and cross-flow type cooling towers. In a counter-flow cooling tower, liquid of high temperature is cooled as it flows downwards through fill or packing and is brought into contact with air traveling upwards. Conversely, in a cross-flow cooling tower, liquid of high temperature is cooled with air that moves horizontally through the fill or packing. The heated air is exhausted into the atmosphere using a fan, and the cooling liquid is collected in a basin situated below the fill or packing.

Liquid is generally distributed through a cooling tower in one of two ways: gravity and spray. Typically, gravity systems are used in cross-flow cooling towers, and pressurized spray systems are used in counter-flow cooling towers. In a spray system, liquid of high temperature is distributed via a closed low-pressure pipe and nozzle system through the cooling tower using in a series of spray nozzles mounted on distribution pipes. The spray nozzles are arranged to evenly distribute the liquid over the top of the fill. Once the liquid travels through the fill, it is collected at the bottom of the tower in a cold liquid basin. In a gravity system, liquid of high temperature is fed into a hot liquid basin disposed above the fill. The liquid then moves down through holes or openings in the bottom of the hot liquid basin to the fill. Similar to the spray system, liquid that travels through the fill is collected at the bottom of the tower in a cold liquid basin.

As the airflow in both the crossflow-type and counter-flow-type of cooling towers moves past the flow of water, water droplets are entrained in the airflow. For a variety of reasons, including reducing water usage, cooling towers typically employ drift eliminator devices that move the air through a non-linear path to remove many droplets and reduce the drift. However, drift eliminators do not generally remove all the drift. This small amount of remaining drift does not typically adversely affect the operation of the cooling tower.

A drawback associated with current cooling towers is that biological growth can occur in the water, on wet surfaces, or in submerged areas of the cooling tower. Portions of this growth can be minimized by reducing light exposure of cooling tower surfaces and components, reducing stagnant water accumulation, and the like. Depending on the organism and location of the growth, the organism can become airborne and transported from the cooling tower as drift. Another drawback is debris within recirculating water can clog nozzles which will impact operation of the cooling tower, and associated water systems.

It is desirable to reduce biological growth in the basin of the cooling tower and/or reduce or remove debris circulating within the water of the tower, as well as maintain consistent water distribution.

SUMMARY OF THE INVENTION

Embodiments of the present disclosure advantageously provide for an apparatus and method of reducing biological growth and/or loose debris in the basin and/or water circulating systems of the cooling tower.

An embodiment of the disclosure pertains to a cooling tower. The cooling tower includes a fill media, a water distribution system to distribute water to the fill media, a basin to collect the water, and a shield disposed in the basin and/or water circulating systems to absorb and/or block light and/or debris from the water.

Another embodiment relates to a method of reducing biological growth and/or debris in a basin and/or water circulating systems of a cooling tower In this method, a flow of water through a fill media is generated, a flow of air through the fill media is generated, the water is collected in a basin, and light is absorbed and/or blocked from the water and/or debris is removed from the water.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The above-mentioned and other features and advantages of this disclosure, and the manner of attaining them, will become more apparent and the disclosure itself will be better understood by reference to the following description of various embodiments of the disclosure taken in conjunction with the accompanying figures.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. It should be appreciated that any list of materials or arrangements of elements is for example purposes only and is by no means intended to be exhaustive. The progression of processing steps described is an example; however, the sequence of steps is not limited to that set forth herein and may be changed as is known in the art, with the exception of steps necessarily occurring in a certain order.

Cooling towers regulate the temperature of relatively warm or hot fluid by passing the fluid through a tower apparatus that brings it into contact with relatively cooler ambient air. These towers typically include a hot liquid distribution system. Examples of these distribution systems may have a series of water distribution nozzles or an apertured distribution basin or the like, and a cold water collection basin positioned at the base or bottom of the cooling tower. Commonly, a water dispersing fill structure is disposed in the space between the hot water distribution system and the underlying cold water collection basin. The aforementioned fill structure oftentimes includes either a plurality of elongated, horizontally arranged and staggered splash bars supported at spaced intervals by an upright grid structure or frame assembly, or a series of fill packs or fill packing composed of a number of film fill sheets. During assembly of the evaporative cooling towers, typically, an outer shell or support structure is built first and then the fill media is installed. In the case of splash type fill, a rack or grid support is affixed to the support shell. Splash bars are then threaded into the rack. The splash bars generally provide a surface for consistent, predictable dispersal and breakup of the water droplets over a range of water loadings typically encountered during operation of the evaporative cooling tower. Typically, these splash bars are long and thin and the fill structure includes a great number of them. In the case of film fill, fill packs may be employed and installed into the support structure of the cooling tower. Fill packs may consist of individual sheets glued or attached by some other means to one another to make blocks. Alternatively, fill packs may consist of sheets hung from support members. Successive sheets are pushed on support members from one end and push down the support member until the support member is populated with the desired number of sheets. The fill packs are then placed in the support structure.

In a cross-flow tower, hot liquid is distributed over the fill section such that it comes into contact with cooler ambient air, which cools the hot liquid as the air travels horizontally or laterally through the fill section. These towers typically include an air inlet region that is disposed adjacent to the fill section, which allows air from outside of the tower to travel into the fill section. Generally, the dimensions of the air inlet region may correspond to the height of the fill section, allowing even distribution of air travel through the fill section. The tower also includes a plenum area or plenum chamber for receiving the air after it has travelled through the fill section, and a fan or other air current generator for directing the air into the atmosphere once again.

Hot liquid may be distributed in a cooling tower using a pipe distribution system. A pump may feed water into the pipes, which carry the water to nozzles that eject the water onto the fill section. The ejected water then travels through the fill section and is collected at the bottom in a cold liquid basin, which may have an outlet (e.g., a pipe opening) for passing the cold liquid out of the cooling tower. As an alternative to a pipe distribution system, hot liquid may also be distributed in a cooling tower using water distribution basins having apertures for the water to flow through onto the fill section. Such as system is known as a gravity-driven distribution system. Once the liquid flows through the fill section and is cooled, it is similarly collected by a cold water basin, which may eject the cooled liquid to the outside.

Air flowing past the falling water can entrain water droplets in the air flow. To remove this drift, fill sections typically include drift eliminators. In this manner, water is eliminated from external areas to the tower, conserved, and icing is reduced. However, some drift does pass through the drift eliminators and is drawn out of the cooling tower via the current generator.

Systems and methods disclosed herein provide a thermoplastic or foam elastomer layer, mat, membrane or other such light shield and/or debris filter, formed into a flat rectangular part or other shape to fit within the water basin of a cooling tower. The shield may be laid flat on the water surface in the basin corner at both end of a crossflow cooling tower. The light shield is configured to cover/shield the sunlight-exposed area at the edge of the water basin, the water area outside the cooling tower fill. The light shield may be infused with a biocide to kill bacteria that may grow in or on it or in this area of the basin. Embodiments of the light shield facilitate effectively controlling bacteria growth in susceptible locations in wet cooling towers. Complexity, cost, and lack of understanding/comfort with of water treatment solutions contribute to issues with conventional biocidal solutions. The light shield is a simple device that can be easily placed, helping control biofilm growth. Advantages of the light shield include providing reduced biological growth in problem areas of the tower; no component assembly; no mixing of hazardous chemicals; airflow blockage of the fill; reduction of falling water noise in counterflow towers, improving water distribution, eliminating vortex, collect debris, and potential biocide introduction.

Figure 1:
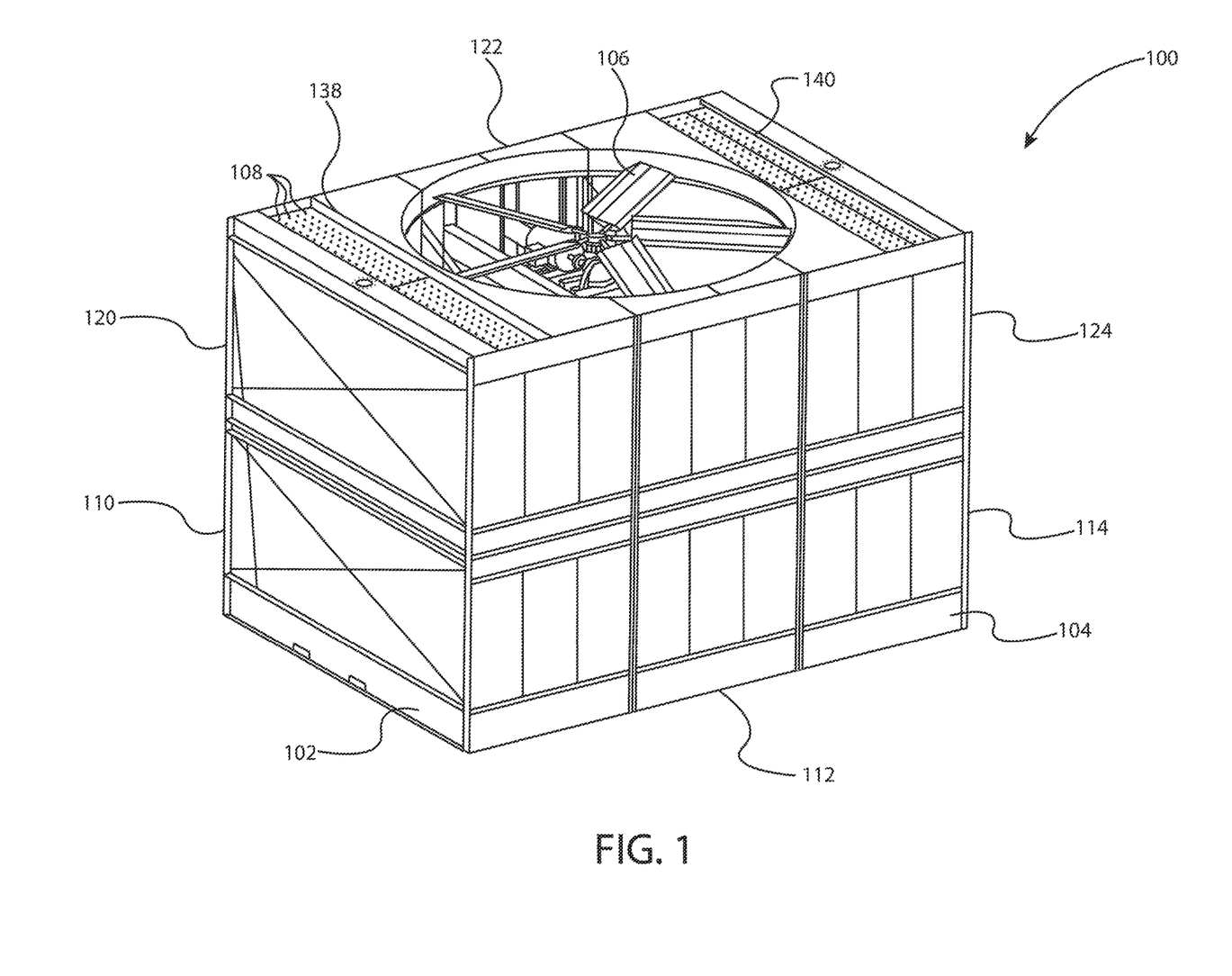
FIG. 1 is a perspective view of a first exemplary cooling tower in accordance with an embodiment of the present disclosure.

Referring now to FIG. 1, a first exemplary cooling tower 100 is depicted. The cooling tower 100 may be, for example, a heat exchange, heat transfer, cooling tower or the like. In the following description of the cooling tower 100, particular mention of the modular construction is mentioned. However, the examples provided herein are for illustrative purposes only. In a particular example, the cooling tower 100 may comprise six (6) modules including: a first collection basin module 110, a plenum module 112, a second collection basin module 114, a first heat exchange module 120, a fan module 122, and a second heat exchange module 124. The cooling tower 100 may also comprise a first water basin 102 and a second water basin 104. Water basins 102, 104 may be examples of the first basin and the second basin, as set forth in the claims.

The first water basin 102 may be disposed in the first collection basin module 110, and the second water basin 104 may be disposed in the second collection basin module 114. More specifically, the first water basin 102 may be disposed at a bottom portion of the first collection basin module 110, and the second water basin 104 may be disposed at a bottom portion of the second collection basin module 114. The first collection basin module 110 and the second collection basin module 114 may be laterally spaced apart from one another, and thus the first water basin 102 and the second water basin 104 may be laterally spaced apart from one another.

As depicted in FIG. 1, the water basins 102, 104 are separately sealed from each other. The water basins 102, 104 may be sealed in a factory prior to being transported to a job site for final assembly in the cooling tower 100. Alternatively, the water basins 102, 104 may be partially constructed in a factory and sealed at a job site. Furthermore, while the water basins 102, 104 are depicted as separately sealed units in FIG. 1, one of ordinary skill in the art would appreciate that the water basins 102, 104 need not be separately sealed but can be in fluid communication with one another such that they form a common basin.

As depicted in FIG. 1, the plenum module 112 is disposed in the space between the first collection basin module 110 and the second collection basin module 114. Together, the first collection basin module 110, the plenum module 112, and the second collection basin module 114, may form a first layer—specifically, a bottom layer or base—of the cooling tower 100.

In a separate layer—specifically, a top layer—the first heat exchange module 120, the fan module 122, and the second heat exchange module 124 may be disposed. The first heat exchange module 120 may be disposed above the first collection basin module 110 or, in other words, the first heat exchange module 120 may be disposed vertically adjacent to the first collection basin module 110. And the second heat exchange module 124 may be disposed above the second collection basin module 114 or, in other words, the second heat exchange module 124 may be disposed vertically adjacent to the second collection basin module 114. The heat exchange modules 120, 124 may be disposed vertically adjacent to the collection basin modules 110, 114 in a longitudinal direction. The collection basin modules 110, 114 and the heat exchange modules 120, 124 may have openings along their exterior sides for allowing air from outside of the cooling tower 100 to travel into the cooling tower 100 or, specifically, to travel into the collection basin modules 110, 114 and the heat exchange modules 120, 124.

The fan module 122 may be disposed vertically adjacent to the plenum module 112. Both the plenum module 112 and the fan module 122 may comprise hollow chambers for receiving air travelling through the collection basin modules 110, 114 and the heat exchange modules 120, 124 from outside of the cooling tower 100. The fan module 122 may also include a supporting attachment for holding a fan cylinder and a fan 106. The fan 106 may be an example of an air current generator, such as a fan or impeller. The fan 106 may pull the air that travels through the collection basin modules 110, 114 and the heat exchange modules 120, 124 from the outside atmosphere into the plenum module 112 and the fan module 122 and back out into the atmosphere.

Figure 3:
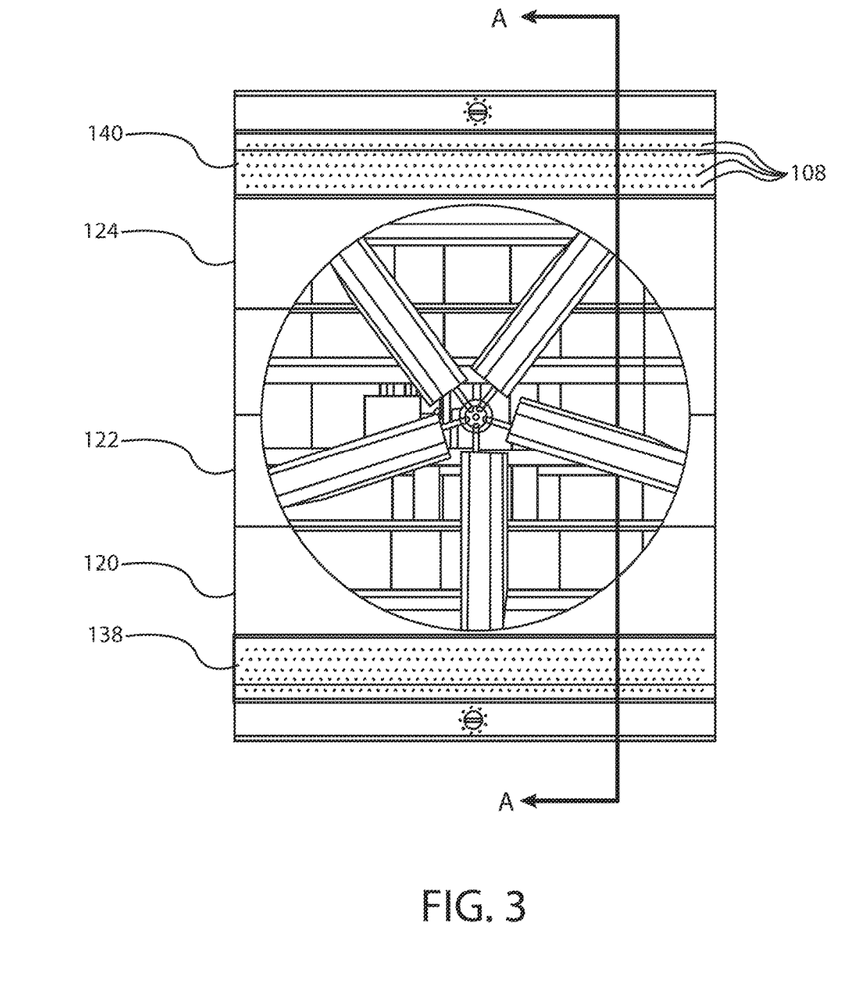
FIG. 3 is a top view of the cooling tower depicted in FIG. 1 showing an air current generator in accordance with an embodiment of the present disclosure.
Figure 4:
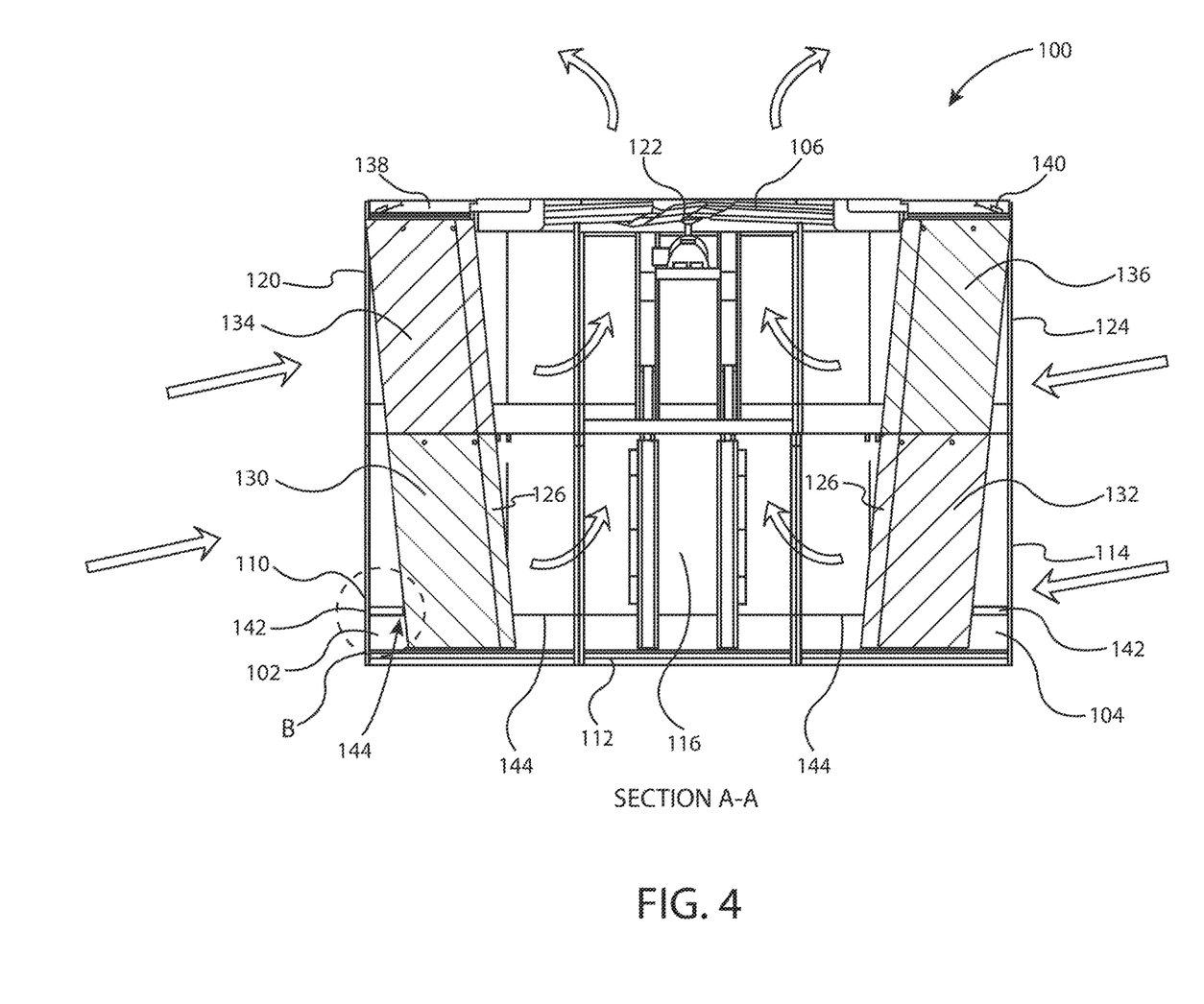
FIG. 4 is a cross-sectional view of the cooling tower depicted in FIG. 1 showing placement of a basin shield on a surface of water in a basin of the cooling tower in accordance with an embodiment of the present disclosure.

Additionally, the cooling tower 100 may comprise a first hot water basin 138 and a second hot water basin 140 (see, e.g., FIGS. 3 and 4). The first hot water basin 138 may be disposed in the first heat exchange module 120, and the second hot water basin 140 may be disposed in the second heat exchange module 124. More specifically, the first hot water basin 138 may be disposed in a top portion of the first heat exchange module 120, and the second hot water basin 140 may be disposed in a top portion of the second heat exchange module 124. Each of the first hot water basin 138 and the second hot water basin 140 may comprise a plurality of openings or apertures 108. The openings may be configured to allow a liquid that is placed in the hot water basins 138, 140 to travel out of the hot water basins 138, 140 and into lower regions of the cooling tower 100 typically via nozzles—specifically, into fill portions or sections disposed in the heat exchange modules 120, 124. Further details regarding the travel of liquid from the hot water basins 138, 140 and through the cooling tower 100 is described in reference to FIG. 4, below.

Figure 2:
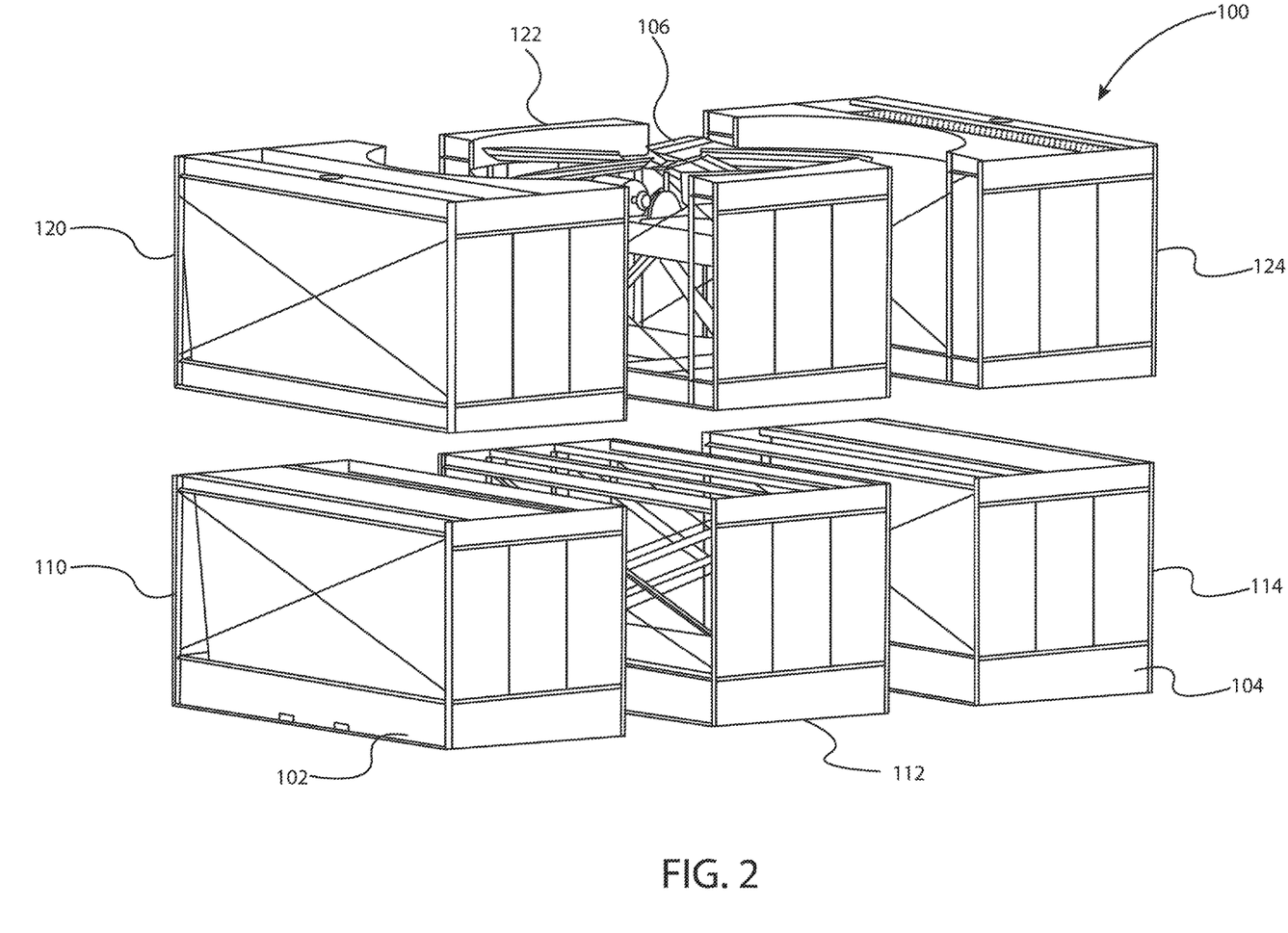
FIG. 2 is an exploded view of the cooling tower depicted in FIG. 1 showing a plurality of internal components of the cooling tower in accordance with an embodiment of the present disclosure.

Referring now to FIG. 2, an exploded view of the cooling tower 100 is depicted. This exploded view shows in greater detail each of the six (6) modular components—the collection basin modules 110, 114; the plenum module 112; the heat exchange modules 120, 124; and the fan module 122—of the cooling tower 100. This exploded view shows that the first water basin 102 is disposed in the first collection basin module 110, and the second water basin 104 is disposed in the second collection basin module 114. The exploded view also shows that the fan 106 is disposed in the heat exchange modules 120, 124 and the fan module 122.

Referring now to FIG. 3, a top view of the cooling tower 100 is depicted. As depicted in FIG. 3, the heat exchange modules 120, 124 and the fan module 122 are disposed adjacent to one another—specifically, the fan module 122 is disposed between the first heat exchange module 120 and the second heat exchange module 124. Further, as shown in FIG. 3, the first hot water basin 138 extends along a length of the first heat exchange module 120, and the second hot water basin 140 extends along a length of the second heat exchange module 124.

FIG. 4 depicts a cross-sectional view of the cooling tower 100 along the line A-A and in the direction of the arrows depicted in FIG. 3. As shown in this cross-sectional view, a plenum 116 of the cooling tower 100 includes one or more basin shields 142 disposed upon or under a surface 144 of water in the basin 102. In a particular example, the basin shields 142 may be disposed in areas subject to debris or light infiltration and configured to shield or absorb light from the water in the basin 102. As shown in detail B of FIGS. 7A-7C, the basin shield 142 may facilitate shielding/absorbing light in a variety of ways.

In various examples, the light shield may be disposed on the water in a portion of the basin 102 outside the plenum 116 and/or the water surface 144 within the plenum. The plenum 116 is defined as a volume within the cooling tower 100 between the inside face of the fill portions 130-136 and the fan 106. Generally, the surface of the water 144 within the plenum 116 is protected from light infiltration by the fill portions 130-136 and so, the basin shield 142 may be omitted in the plenum 116. As shown by the arrows, air enters the plenum 116 as it is drawn through the fill portions 130-136 by the fan 106 and is then ejected from the cooling tower 100 via the fan 106. To reduce the drift entering the plenum 116, the fill portions 130-136 each include a drift eliminator 126. In a particular example, the drift eliminator may be configured to reduce the amount of drift to 0.001% of circulating water or less.

To continue with the general description of the cooling tower 100, each of the collection basin modules 110, 114 and the heat exchange modules 120, 124 include a fill portion. Specifically, the first collection basin module 110 includes a first fill portion 130. The second collection basin module 114 includes a second fill portion 132. The first heat exchange module 120 includes a third fill portion 134. And the second heat exchange module 124 includes a fourth fill portion 136. The fill portions 130, 134 may form a first heat exchange section, and the fill portions 132, 136 may form a second heat exchange section.

While the heat exchange modules 120, 124 are described as containing fill, one of ordinary skill in the art would appreciate that the heat exchange modules 120, 124 may comprise other heat exchange means, such as, for example, closed circuit coils or tube bundles.

During operation, hot water placed in the hot water basins 138, 140 may travel through the cooling tower 100 in the longitudinal direction towards the cold water basins 102, 104. Specifically, hot water that is placed in the first hot water basin 138 may travel through the openings 108 in the first hot water basin 138 and into the third fill portion 134 and then into the first fill portion 130. In other words, the first fill portion 130 and the third fill portion 134 form a continuous path for the hot water which is placed in the first hot water basin 138 to travel along and into the first cold water basin 102. As the hot water travels along the length of the first fill portion 130 and the third fill portion 134 or, the first fill section, it is cooled by cooler ambient air that travels horizontally (or substantially horizontally) into the first collection basin module 110 and the first heat exchange module 120 or, specifically, the first fill portion 130 and the third fill portion 134 disposed in the first collection basin module 110 and the first heat exchange module 120, respectively, from outside of the cooling tower 100. Thus, when the hot water reaches the first cold water basin 102, it has been cooled and is therefore received as cold water in the first cold water basin 102. The ambient air, which has been used to cool the hot water, is drawn into the plenum module 112 and the fan module 122 by the fan 106 and upwards and out of the cooling tower 100.

Similarly, hot water placed in the second hot water basin 140 may travel through the openings 108 in the second hot water basin 140 and into the fourth fill portion 136 and the second fill portion 132. The hot water that is placed in the second hot water basin 140 is separate from the hot water that is placed in the first hot water basin 138. Like the first fill portion 130 and the third fill portion 134, the second fill portion 132 and the fourth fill portion 136 form a continuous path for the hot water which is placed in the second hot water basin 140 to travel along and into the second cold water basin 104. Much in the same way that the hot water placed in the first water basin 138 is cooled, the water placed in the second hot water basin 140 is cooled using cooler ambient air which enters the second fill portion 132 and the fourth fill portion 136 from the sides of the second collection basin module 114 and the second heat exchange module 124.

The operation of cooling the hot water that is placed in the hot water basins 138, 140 that is described in that of a cross-flow cooling tower. Thus, the fill portions 130, 132, 134, 136 may comprise cross-flow fill.

To assemble the cooling tower 100 depicted in FIG. 1, the bottom layer of modules may be positioned, and then the top layer of modules may be positioned on top of the bottom layer of modules. For example, the first collection basin module 110 may be positioned, and the second collection basin module 114 may be positioned laterally spaced apart from the first collection basin module 110. The plenum module 112 may be positioned in the space between the first collection basin module 110 and the second collection basin module 114. The plenum module may be positioned prior to the fill modules. The first heat exchange module 120 may be positioned on top of (or vertically adjacent to) the first collection basin module 110, and the second heat exchange module 124 may be positioned on top of (or vertically adjacent to) the second collection basin module 114. The first heat exchange module 120 and the second heat exchange module 124 may be placed such that the fill portions 134, 136 line up with the fill portions 130, 132, respectively, such that the fill portion 130 and the fill portion 134 create a continuous fill section and the fill portion 132 and the fill portion 136 create a continuous fill section. The fan module 122 may be positioned on top of the plenum module 112 in between the first heat exchange module 120 and the second heat exchange module 124. The fan module may be positioned prior to the fill modules.

The cooling tower 100 depicted in FIG. 1 comprises a single cell. Nonetheless, one of ordinary skill in the art would appreciate that the module heat transfer tower 100 may comprise more than one cell. Importantly though, as depicted in FIG. 1, each cell of the cooling tower 100 would comprise at least two (2) water basins (e.g., water basins 102, 104), and each cell can be divided into six (6) modules.

Each of the six (6) modules of the cooling tower 100 may be assembled in a factory and transported to a job site for final assembly in the cooling tower 100. In particular, the first collection basin module 110 may be assembled in a factory including the first water basin 102, and the second collection basin module 114 may be assembled in a factory including the second water basin 104. Because both the first water basin 102 and the second water basin 104 are assembled into modules at the factory, no water sealing would need to be done at the job site where the cooling tower 100 is assembled. The fan 106 and the fan cylinder (not labeled) may be assembled at the job site.

Figure 5:
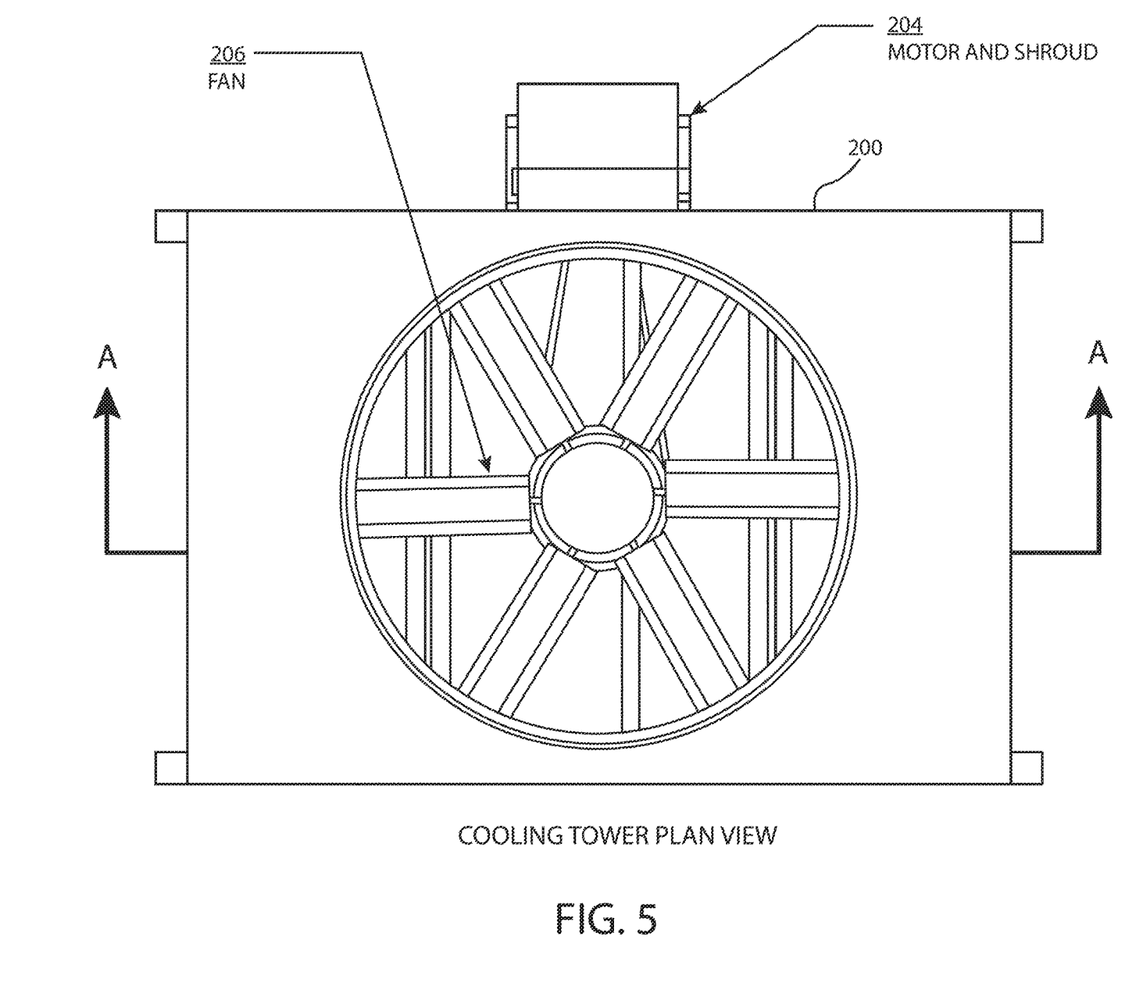
FIG. 5 is a top view of a second exemplary cooling tower showing an air current generator in accordance with an embodiment of the present disclosure.

FIG. 5 is a top view of a second exemplary cooling tower 200 showing a fan 206 in accordance with an embodiment of the present disclosure. Also shown in FIG. 5 is a motor and shroud 204 configured to drive the fan 206.

Figure 6:
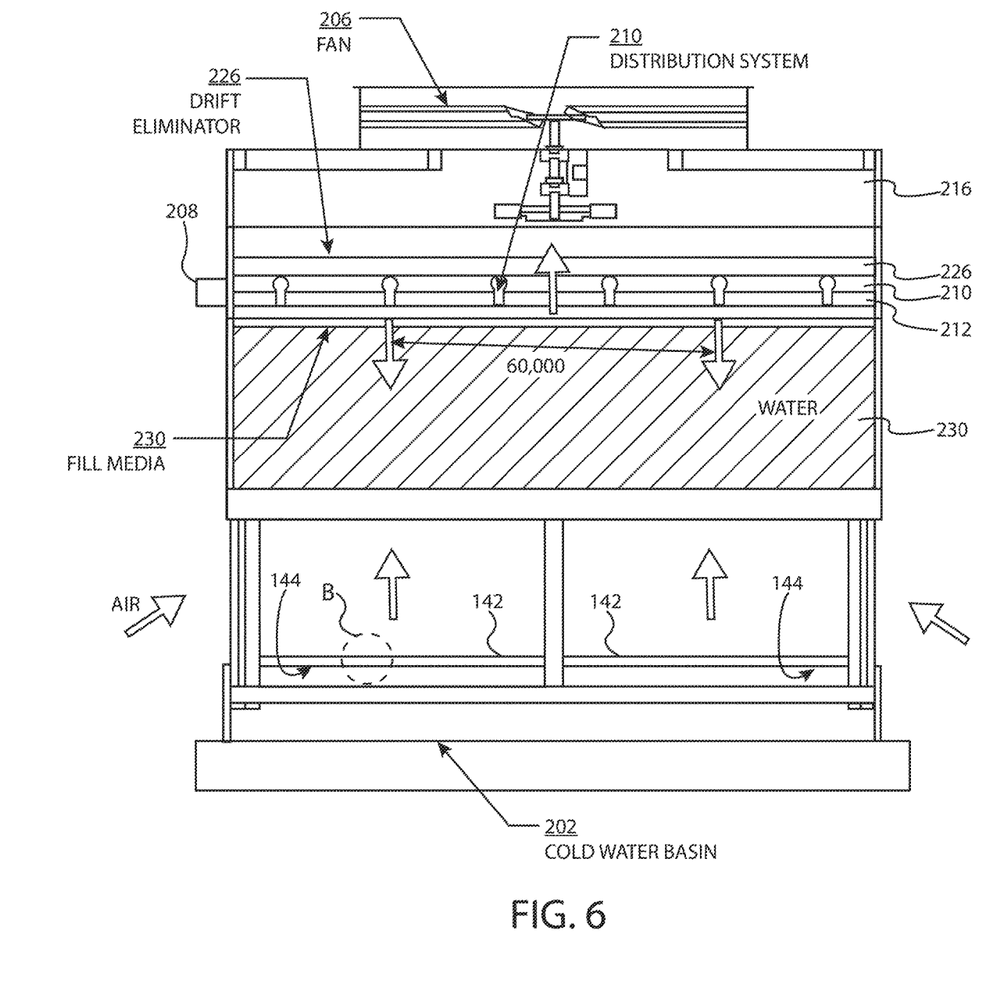
FIG. 6 is a cross-sectional view of the cooling tower depicted in FIG. 5 showing placement of the basin shield on the surface of water in the basin of the cooling tower in accordance with an embodiment of the present disclosure.

FIG. 6 is a cross-sectional view of the cooling tower 200 depicted in FIG. 5. As shown in FIG. 6, the cooling tower 200 includes a water basin 202, the fan 206, a water inlet 208, a water distribution system 210, a distribution support system 212, a plenum 216, a drift eliminator 226, and a fill media 230. The cooling tower 200 is an example of a counterflow heat exchange that is generally understood except for the novel addition of the basin shield 142. In a manner similar to that already described herein, the light shield is disposed on the surface 144 of the water in the basin 202 and configured to shield or absorb light. In this manner, biological growth in the water is reduced or eliminated. Of note, the fill media 230 encompasses any suitable heat exchange media and/or device. Examples of suitable heat exchange media include packs of convoluted polymer sheeting, fabric, mesh, slats, pipes and finned pipes for conveying a process fluid, and the like.

Figure 7A:
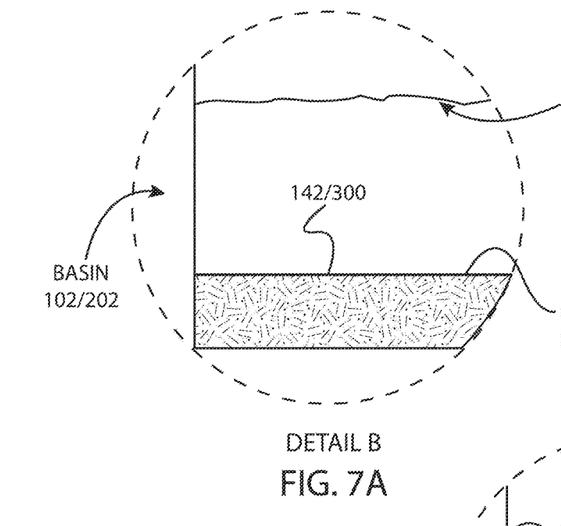
FIG. 7A is a detailed cross sectional view C of the basin shield in accordance with an embodiment of the present disclosure.
Figure 7B:
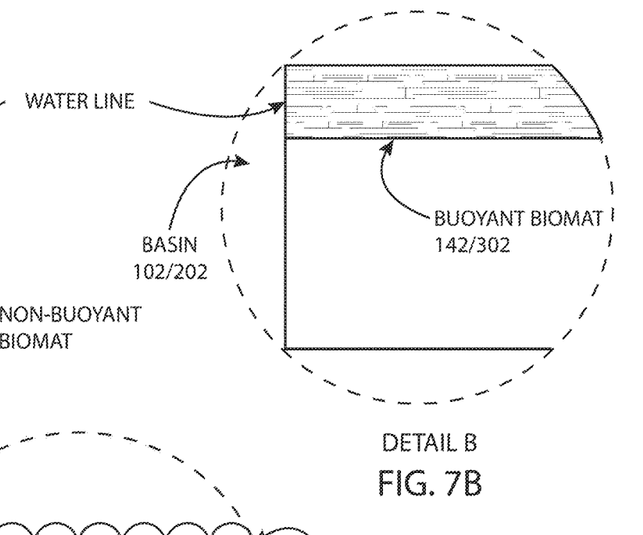
FIG. 7B is a detailed cross sectional view C of the basin shield in accordance with another embodiment of the present disclosure.
Figure 7C:
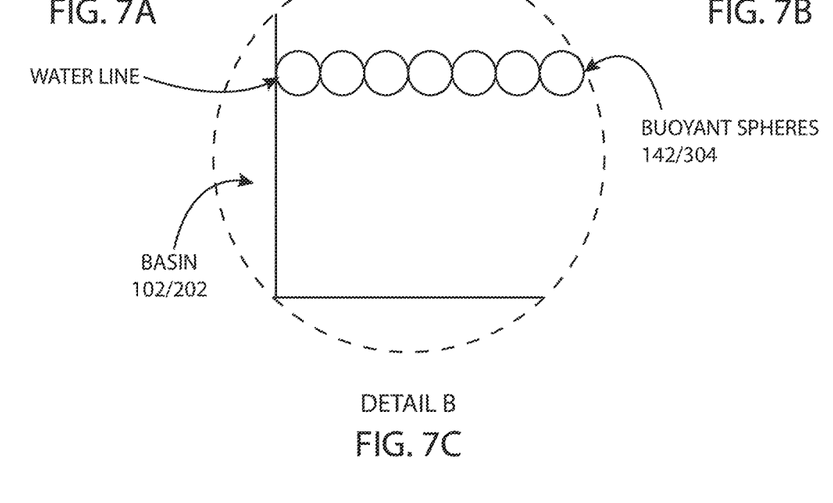
FIG. 7C is a detailed cross sectional view C of the basin shield in accordance with yet another embodiment of the present disclosure.

FIGS. 7A-7C are detailed cross section views of Detail B shown in FIGS. 4 and 6. In general, steps are taken to reduce the amount of light entering a cooling tower so as to reduce or discourage growth of algae and other photosynthetic organisms. However, due to the need of allowing air to flow through the cooling tower, some light may enter. Embodiments of the invention described herein discourage growth of algae and other photosynthetic organisms by absorbing and/or blocking light from water in the basin 102/202. For the purposes of this disclosure, the term, "shield" refers to a structure for absorbing and/or blocking light. In each of the FIGS. 7A-7C, the basin shield 142 is included to discourage growth of algae and other photosynthetic organisms.

As shown in FIG. 7A, the basin shield 142 includes a non-buoyant mat 300 or biomat. In various examples, the non-buoyant mat 300 utilized in the basin shield 142 may be sufficiently dense enough to sink to the bottom of the basin 102/202 and/or the basin shield 142 may be affixed to the bottom of the basin 102/202. In general, the non-buoyant mat 300 may be a dark color such as black and configured to absorb light. In this manner, light reflection may be reduced. The non-buoyant mat 300 may include any suitable material. In general, suitable materials include those that absorb light, are rot resistant, and are not readily metabolized by organisms. In a particular example, the non-buoyant biomat 300 is a random strand or felted thermoplastic mat. Optionally, a biocidal additive may be incorporated into the thermoplastic mat.

As shown in FIG. 7B, the basin shield 142 includes a buoyant mat 302 or floating biomat. In various examples, the buoyant mat 302 utilized in the basin shield 142 may have a lower density than water to facilitate the basin shield 142 at least partially floating on the water in the basin 102/202. In other aspects, the basin shield 142 and the buoyant mat 302 may be the same or similar to the non-buoyant mat 300 described with reference to FIG. 7A.

As shown in FIG. 7C, the basin shield 142 includes a plurality of buoyant spheres 304. In general, a sufficient number of spheres 304 may be disposed in the basin 102/202 to form a contiguous layer. The spheres 304 may be solid or hollow so long as the density remains below the density of water. In other aspects, the basin shield 142 and the plurality of buoyant spheres 304 may be the same or similar to the non-buoyant and buoyant mat 300/302 described with reference to FIGS. 7A and 7B. For example, the spheres may be formed from a thermoplastic and the thermoplastic may, optionally, include a biocide.

Figures 8, 9, 10:
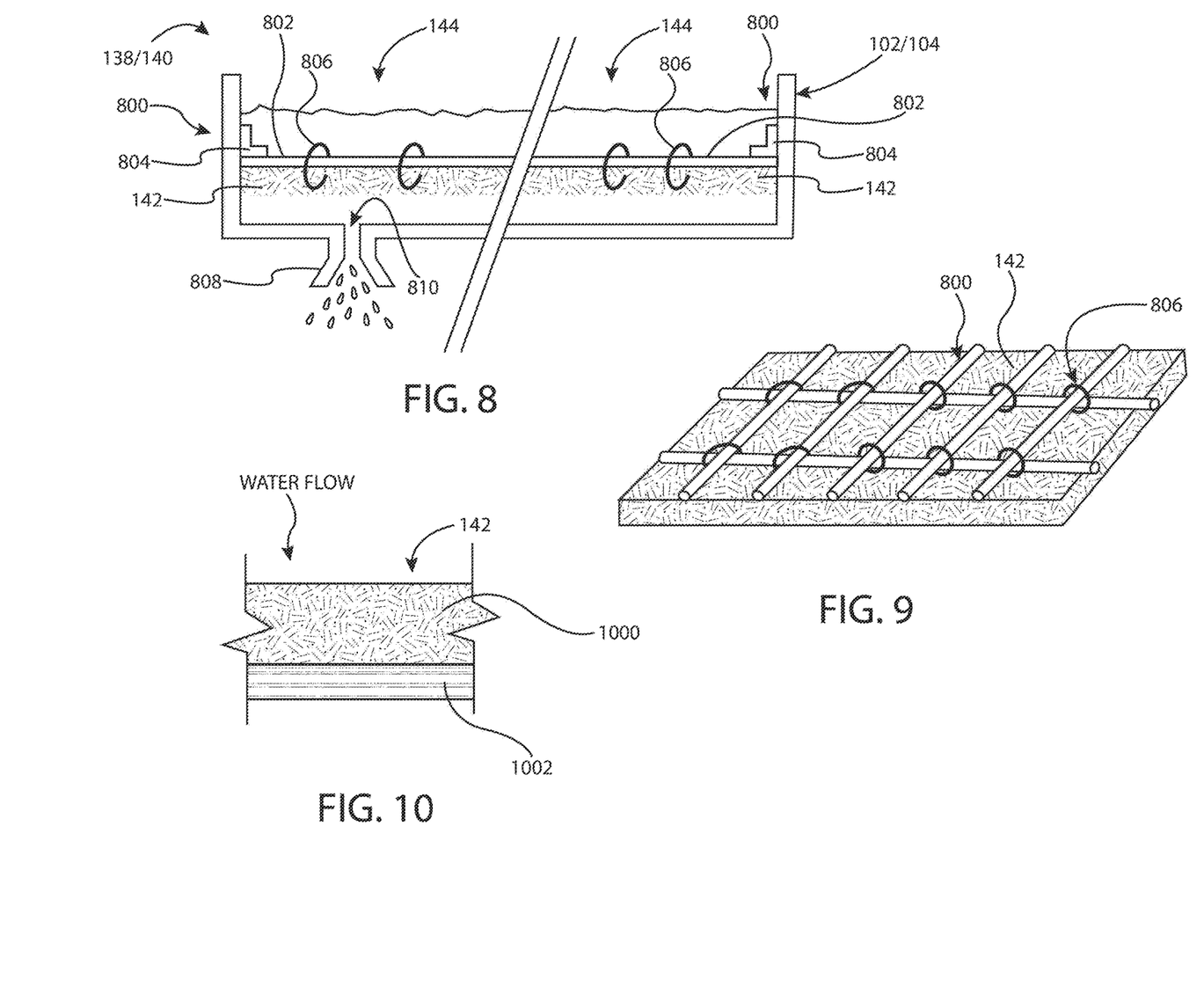
FIG. 8 is a cross-sectional view of the basin shield disposed in an upper/lower basin of the cooling tower depicted in FIG. 1 showing a secured placement of the basin shield in the basin water of the cooling tower in accordance with an embodiment of the present disclosure.
FIG. 9 is a perspective view of the basin shield and securing grid in accordance with an embodiment of the present disclosure.
FIG. 10 is a cross-sectional view of the basin shield in accordance with another embodiment of the present disclosure.

FIG. 8 is a cross-sectional view of the basin shield 142 disposed in an upper/lower basin 138, 140, 102, 104 of the cooling tower 100 depicted in FIG. 1 showing a secured placement of the basin shield 142 in the basin water of the cooling tower 100 in accordance with an embodiment of the present disclosure. As shown in FIG. 8, a fastening system 800 for the basin shield 142 includes a gridwork 802, brackets 804, and optional ties 806. The fastening system facilitates securing the basin shield 142 in the upper/lower basin 138, 140, 102, 104. It is a benefit of the secured basin shield 142 disposed in the upper basin 138 and 140 that debris may be captured in the open mesh of the basin shield 142. In this manner, functionality of a spray nozzle 808 may be improved due to decreased obstruction of its inlet 810. Another benefit is that the basin shield may reduce or prevent vortices forming above the inlet 810 and therefore improve consistency in head pressure to the spray nozzle 808. In the lower basins 102 and 104, the basin shield 142 may reduce buildup of sediment and improve the functionality of the basin drain system (not shown).

The gridwork 802 may include any suitable material such as metal, plastic, wood, fiber reinforced resin (FRP), or the like. The brackets 804 may include any suitable material or structure suitable for securing the gridwork 802. While an "L" bracket is shown, the bracket 804 may include a clip, "U" channel, or the like. If included, the optional ties 806 may include polymer ratcheting straps such as "zip ties", string, wire, or the like.

A benefit of the fastening system 800 is that it facilitates proper shield installation and placement while providing easy access and use for quick inspection, replacement, and/or cleaning.

FIG. 9 is a perspective view of the shield 142 and securing gridwork 802 in accordance with an embodiment of the present disclosure. As shown in FIG. 9, the gridwork 802 is open to allow unimpeded flow of water through the gridwork 802 and into the basin shield 142. Of note, while the gridwork 802 is shown upstream relative to the basin shield 142 and a flow of water through the basin, in other examples, the gridwork 802 may be disposed downstream of the basin shield 142.

FIG. 10 is a cross-sectional view of the basin shield 142 in accordance with another embodiment of the present disclosure. As shown in FIG. 10, the basin shield 142 may include a plurality of weave or mesh densities. For example, the basin shield 142 may include an open mesh portion 1000 and a relatively tighter mesh portion 1002 disposed relatively downstream of the open mesh portion 1000. In this way, the open mesh portion may provide a filter medium configured to trap larger debris such as leaves, for example, while still allowing water to flow therethrough. The tighter mesh portion 1002 is configured to remove smaller debris such as dirt, decomposing leaf litter, or the like. In another example, the layers of shield are reversed, and the tighter mesh is on the entrance side of the water flow, creating ease of debris removal.

Figure 11:
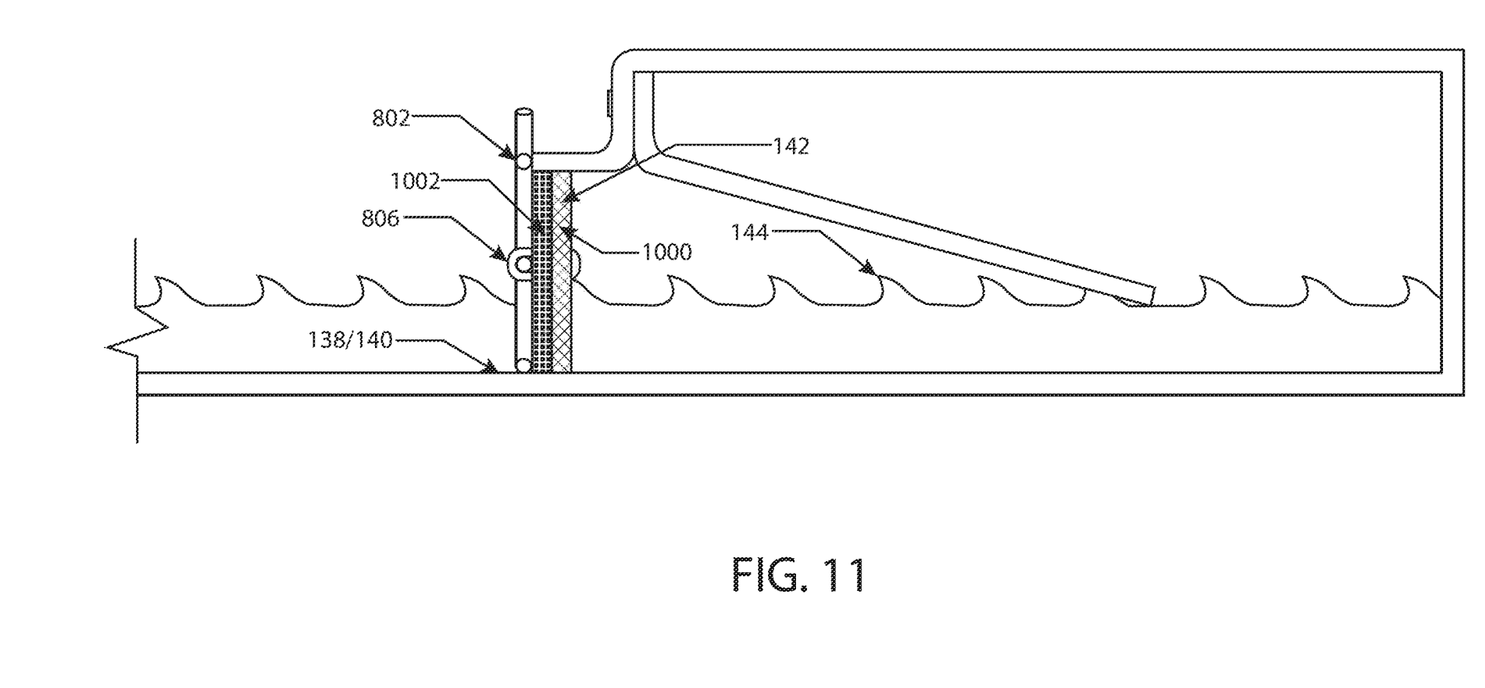
FIG. 11 is a cross-sectional view of the basin shield in accordance with yet another embodiment of the present disclosure.

FIG. 11 is a cross-sectional view of the basin shield 142 in accordance with yet another embodiment of the present disclosure. As shown in FIG. 11, the basin shield of FIG. 11 is similar to the basin shield of FIGS. 8-11, and thus, for the sake of brevity, those detailed described above will not be described again. To continue, the basin shield 142 of FIG. 11 is disposed in a vertical or 'upright' orientation and positioned to filter a flow of water moving therethrough. An advantage of the embodiment shown in FIG. 11 is that a reduced amount of the basin shield may be required to filter the water which may, in turn, ease installation and maintenance. The embodiment of FIG. 11 may be particularly suitable for installations which anticipate little debris and/or light infiltration.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, for example an induced draft heat exchanger has been illustrated but a forced draft design can be adapted to gain the same benefits and, accordingly, all suitable modifications and equivalents may be resorted to that fall within the scope of the invention. As noted above, another example is replacing one or more of the modules containing fill with modules that may include closed circuit coils or tube bundles for cooling and/or condensing fluids. In yet another example one or more modules may include fill and closed circuit coils, tube bundles, or splash bars.

Another construction in the spirit of the scope of this invention is to add more modules in plan view. For example a tower of approximately twice the cooling capacity could be comprised of twice as many collection basin modules, twice as many heat exchange modules and four times as many plenum and fan modules. More than twice as many plenum and fan modules may desirable to place a larger diameter fan. Furthermore, an odd number of plenum and fan modules may desirable to have a central module that contains the fan mechanical equipment, particularly the motor, gearbox, and fan hub.

Yet another construction is spirit of the scope of this invention is to add more modules vertically. For example additional modules with heat exchangers could be placed between the collection modules and the heat exchange modules as previously described. Additional modules between the plenum modules and the fan modules can be placed to compliment taller overall heat exchanger assemblies.

Also, in the spirit of the scope of the invention is a construction using fewer modules. For example the plenum module or portions of the plenum module can be incorporated in one or both collection basin modules. Likewise, the fan module or portions of the fan module can be incorporated in one or both of the heat exchange modules.

Another construction in the spirit of the scope of the invention using fewer modules may be a one module high tower with two collection basin modules. The plenum and fan may also reside in those same collection basin modules but may also reside in a separate single module. In this case, the first heat exchange section and the second heat exchange sections are fully contained in the respective collection basin modules.

What is claimed is:

1. A cooling tower, comprising:
   a fill media;
   a water distribution system to distribute water to the fill media;
   a hot water basin to supply the water to the water distribution system;
   a collection basin to collect the water;
   a buoyant mat is configured to partially float on a surface of the water in the hot water basin, the buoyant mat is further configured to block light from entering the water, collect debris from the water, or a combination of both; and
   a gridwork affixed to the buoyant mat and fastened to the hot water basin to retain the buoyant mat therein.

2. The cooling tower according to claim 1, wherein the shield buoyant mat includes an open mesh portion and a portion with a tighter mesh.

3. The cooling tower according to claim 1, wherein the shield buoyant mat is a felted mat, a mat including a plurality of spheres forming a contiguous layer in the water, or a combination thereof.

4. The cooling tower according to claim 1, wherein the shield buoyant mat includes a biocide incorporated therein.

5. The cooling tower according to claim 1, wherein the fill media includes one or a combination of packs of convoluted polymer sheeting, fabric, mesh, slats, and pipes and/or finned pipes for conveying a process fluid.

6. The cooling tower according to claim 1, wherein the buoyant mat is configured to filter a flow of water passing therethrough.

7. The cooling tower according to claim 1,
   wherein the water distribution system includes at least one nozzle to distribute water to the fill media;
   the buoyant mat disposed in the hot water basin is upstream of the at least one nozzle.

8. The cooling tower according to claim 7, wherein the buoyant mat is a first buoyant mat and the cooling tower further comprises a second buoyant mat disposed in the collection basin.

9. The cooling tower according to claim 8, wherein the second buoyant mat comprises a plurality of weave densities.

10. The cooling tower according to claim 8, wherein the second buoyant mat is provided in the form of a random strand thermoplastic mat, a mat comprising a plurality of spheres forming a contiguous layer in the water, or a combination thereof.

11. The cooling tower according to claim 8, wherein the first buoyant mat is provided in the form of at least one of a thermoplastic, a reinforced plastic, a metal, a wood, a ceramic, or a textile, or a combination thereof.

12. The cooling tower according to claim 8, wherein the first buoyant mat is designed for water to flow therethrough and the second buoyant mat is designed for water to flow therethrough.

13. The cooling tower according to claim 8, wherein the second buoyant mat comprises a rot-resistant material.

14. The cooling tower according to claim 8, wherein the second buoyant mat is provided in the form of a thermoplastic, a reinforced plastic, a metal, a wood, a ceramic, or a textile, or a combination thereof.

15. The cooling tower according to claim 7, wherein the at least one nozzle is in fluid communication with the hot water basin, and wherein the shield buoyant mat is designed to reduce a quantity of vortices that form proximate to the at least one nozzle.

16. The cooling tower according to claim 1, wherein the buoyant mat has a density less than the density of water.

17. The cooling tower according to claim 1, wherein the buoyant mat comprises a rot-resistant material.

* * * * *